United States Patent
Kim et al.

(10) Patent No.: US 11,557,814 B2
(45) Date of Patent: Jan. 17, 2023

(54) CROSSLINKED POLYOLEFIN SEPARATOR AND METHOD OF MANUFACTURING THE SAME

(71) Applicant: W-SCOPE KOREA CO., LTD., Cheongju-si (KR)

(72) Inventors: Byung Hyun Kim, Cheongju-si (KR); Hee Min Cho, Cheongju-si (KR); Pyung Yong Park, Cheongju-si (KR); Gi Won Yoo, Cheongju-si (KR); Yeong Hoon Choi, Cheongju-si (KR); Won Keun Choi, Cheongju-si (KR)

(73) Assignees: W-SCOPE KOREA CO., LTD., Cheongju-si (KR); W-SCOPE CHUNGJU PLANT CO., LTD., Chungju-si (KR)

( * ) Notice: Subject to any disclaimer, the term of this patent is extended or adjusted under 35 U.S.C. 154(b) by 16 days.

(21) Appl. No.: 16/740,206

(22) Filed: Jan. 10, 2020

(65) Prior Publication Data
US 2020/0343506 A1   Oct. 29, 2020

(30) Foreign Application Priority Data
Apr. 26, 2019 (KR) .......................... 10-2019-0049249

(51) Int. Cl.
*H01M 50/44* (2021.01)
*H01M 50/411* (2021.01)
(Continued)

(52) U.S. Cl.
CPC .......... *H01M 50/44* (2021.01); *H01M 50/403* (2021.01); *H01M 50/411* (2021.01); *H01M 50/449* (2021.01)

(58) Field of Classification Search
CPC ... H01M 50/403; H01M 50/411; H01M 50/44
See application file for complete search history.

(56) References Cited

U.S. PATENT DOCUMENTS

| | | | |
|---|---|---|---|
| 2010/0227223 A1† | 9/2010 | Noumi | |
| 2011/0212358 A1* | 9/2011 | Usami | B32B 27/32 429/145 |

(Continued)

FOREIGN PATENT DOCUMENTS

| | | | |
|---|---|---|---|
| CN | 103421208 A | † | 12/2013 |
| CN | 103811702 A | † | 5/2014 |

(Continued)

OTHER PUBLICATIONS

Gokhan Temel et al., Synthesis of Main Chain Polymeric Benzophenone Photoinitiator via Thiol-ene Click Chemistry and Its Use in Free Radical Polymerization, 5306-5312, Oct. 28, 2020, Journal of Polymer Science: Part A: Polymer Chemistry.†

(Continued)

*Primary Examiner* — Stephan J Essex
(74) *Attorney, Agent, or Firm* — Studebaker & Brackett PC (57) ABSTRACT

Disclosed are a separator that includes fibrils including a polyolefin; and bond structures generated by reacting at least some of a first radical formed on surfaces of the fibrils by a photoreactive material and a second radical formed in the photoreactive material, and a method of manufacturing the separator.

6 Claims, 3 Drawing Sheets

(51) Int. Cl.
H01M 50/403 (2021.01)
H01M 50/449 (2021.01)

(56) References Cited

U.S. PATENT DOCUMENTS

| | | | | |
|---|---|---|---|---|
| 2011/0294016 | A1* | 12/2011 | Tamura | C08F 110/06 |
| | | | | 429/251 |
| 2017/0155110 | A1* | 6/2017 | Yashiki | H01M 10/0525 |
| 2018/0053925 | A1* | 2/2018 | Modeki | H01M 10/0566 |
| 2018/0097256 | A1 | 4/2018 | Modeki | |
| 2018/0294513 | A1* | 10/2018 | Hwang | H01M 4/366 |

FOREIGN PATENT DOCUMENTS

| | | | |
|---|---|---|---|
| CN | 107431235 A | | 12/2017 |
| CN | 108 192 116 A | | 6/2018 |
| CN | 109054073 A | † | 12/2018 |
| JP | H11-144700 A | | 5/1999 |
| JP | H11-172036 A | | 6/1999 |
| JP | 4583532 B2 | | 11/2010 |
| KR | 10-2015-0071378 A | | 6/2015 |
| KR | 10-1536062 B1 | | 7/2015 |
| KR | 101536062 B1 | † | 7/2015 |
| KR | 10-1955911 B1 | | 3/2019 |
| WO | WO-0134388 A1 * | 5/2001 | ............ B32B 27/32 |
| WO | 2015/093683 A1 | | 6/2015 |
| WO | 2018/095094 A1 | | 5/2018 |

OTHER PUBLICATIONS

Jason C. Morris et al., Photo-induced proton coupled electron transfer from a benzophenone 'antenna' to an isoindoline nitroxide, 95598-95603, Nov. 6, 2015, The Royal Society of Chemistry.†

* cited by examiner
† cited by third party

FIG. 4

# CROSSLINKED POLYOLEFIN SEPARATOR AND METHOD OF MANUFACTURING THE SAME

CROSS-REFERENCE TO RELATED APPLICATION

This application claims priority to and the benefit of Korean Patent Application No. 10-2019-0049249, filed on Apr. 26, 2019, the disclosure of which is incorporated herein by reference in its entirety.

BACKGROUND

1. Field of the Invention

The present disclosure relates to a crosslinked polyolefin separator and a method of manufacturing the same, and more particularly to a photocrosslinked polyolefin separator and a method of manufacturing the same.

2. Discussion of Related Art

Lithium secondary batteries are widely used as power sources for various electrical products that require miniaturization and weight reduction, such as smart phones, laptops, and tablet PCs. As the application range of lithium secondary batteries expands to smart grids, and medium and large batteries for electric vehicles, there is a need for development of lithium secondary batteries with large capacity, a long lifespan, and high stability.

As a means for achieving the above objects, research on a separator by which a positive electrode and a negative electrode are separated from each other to prevent internal shorts and in which micropores are formed to facilitate the movement of lithium ions during a charging/discharging process, particularly a microporous separator which is advantageous for pore formation by thermally induced phase separation and is manufactured using a polyolefin such as polyethylene that is economical and easily satisfies the properties required for a separator, is actively underway.

However, a separator manufactured using polyethylene having a low melting point of about 135° C. may exhibit shrinkage deformation at a high temperature above the melting point due to heat generation of a battery. When a short circuit occurs due to such deformation, thermal runaway of a battery may occur, causing safety problems such as fire. To address such a problem, a method of improving heat resistance by crosslinking a polyolefin separator has been proposed.

Japanese Unexamined Patent Application Publication Nos. 11-144700 and 11-172036 disclose crosslinked separators manufactured using a silane-modified polyolefin to improve heat resistance. However, it is impossible to commercialize separators manufactured according to such methods because the separators have a thickness of 25 μm, an air permeability of 900 sec/100 ml, and a puncture strength of 200 gf, which are considerably inferior to the properties, such as a thickness of 12 μm or less, an air permeability of 150 sec/100 ml or less, and a puncture strength of 250 gf or higher, of commercially available separators.

Japanese Patent No. 4583532 discloses a method of mixing ultra-high molecular weight polyethylene having a weight average molecular weight of 50,000 or more with a silane-modified polyolefin to manufacture a separator. However, the ultra-high molecular weight polyethylene has a disadvantage wherein dispersibility with a silane-modified polyolefin is poor. Accordingly, a deviation among manufactured separators is high, such that a waste rate thereof is high. In addition, a silane-crosslinkable polyolefin is concentrated in some regions, such that a separator having uniform properties cannot be obtained.

Korean Patent No. 1536062 discloses a microporous separator for secondary batteries formed of a resin composition that includes 0.01 to 1 part by weight of a photoinitiator and 0.001 to 5 parts by weight of a linking agent based on 100 parts by weight of a polyolefin resin. However, since the microporous separator is manufactured by a drying process, mechanical properties, such as tensile strength and tensile elongation, and heat resistance represented by a meltdown temperature are very poor, compared to a separator manufactured by a wet process.

Korean Patent No. 1955911 discloses a method of manufacturing a separator characterized by crosslinking a silane-modified polyolefin included in a porous membrane, and a separator manufactured according to the method. However, since the crosslinking is carried out in the presence of water, the time required for the crosslinking is at least 10 minutes. Accordingly, there is a limit to an increase in productivity.

SUMMARY OF THE INVENTION

Therefore, the present disclosure has been made in view of the above problems, and it is an objective of the present disclosure to provide a method of manufacturing a separator which is capable of providing significantly improved productivity by shortening a time required for crosslinking while balancing mechanical properties and heat resistance and a separator manufactured according to the method.

In accordance with an aspect of the present disclosure, the above and other objects can be accomplished by the provision of a separator, including: fibrils including a polyolefin; and bond structures generated by reacting at least some of a first radical formed on surfaces of the fibrils by a photoreactive material and a second radical formed in the photoreactive material.

In an embodiment, the polyolefin may have a weight average molecular weight (Mw) of 250,000 to 800,000 and a molecular weight distribution (Mw/Mn) of 3 to 7.

In an embodiment, the polyolefin may be one selected from a group consisting of polyethylene, polypropylene, polybutylene, polymethylpentene, ethylene vinyl acetate, ethylene butyl acrylate, ethylene ethyl acrylate and a combination or copolymer of two or more thereof.

In an embodiment, the photoreactive material may be a hydrogen abstraction photoinitiator.

In an embodiment, the hydrogen abstraction photoinitiator may be one selected from a group consisting of benzophenone-, camphorquinone-, anthraquinone-, thioxanthone-, α-hydroxyketone-, bisacylphosphinoxide-, α-aminoketone-, phenylglyoxylate-, monoacylphosphinoxide-, and benzildimethylketal-based photoinitiators, substituents or derivatives thereof, and combinations of two or more thereof.

In an embodiment, the bond structure may further include one linking agent selected from a group consisting of divinylbenzene, bisphenol-A dimethacrylate, bisphenol-A epoxydiacrylate, triallyl cyanurate, triallyl isocyanurate, pentaerythritol triallyl ether, butanediol diacrylate, ethylene glycol diacrylate, and combinations of two or more thereof.

In an embodiment, the content of the bond structures in the separator may be 0.001 to 10% by weight.

In an embodiment, the separator may satisfy one or more of (i) to (v):

(i) meltdown temperature: 170 to 350° C.; (ii) machine-direction (MD) tensile strength: 700 to 3,000 kgf/cm$^2$; (iii) transverse-direction (TD) tensile strength: 700 to 3,000 kgf/cm$^2$; (iv) machine-direction (MD) tensile elongation: 30 to 150%; and (v) transverse-direction (TD) tensile elongation: 30 to 150%.

In accordance with another aspect of the present disclosure, there is provided an electrochemical device including the separator, preferably a secondary battery including the separator, more preferably a lithium secondary battery or lithium ion battery including the separator.

In accordance with still another aspect of the present disclosure, there is provided a method of manufacturing a separator, the method including: feeding a composition including a polyolefin and a pore-forming agent into an extruder and molding and stretching the same into a sheet; extracting the pore-forming agent from the stretched sheet to manufacture a porous membrane; applying a solution including a photoreactive material to the porous membrane or impregnating the porous membrane in the solution; and irradiating the porous membrane with light to generate bond structures by reacting at least some of a first radical formed by the photoreactive material and a second radical formed in the photoreactive material.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present disclosure is described in detail with reference to the accompanying drawings. However, the present disclosure may be implemented in various different forms and is not limited to these embodiments. To clearly describe the present disclosure, a part irrelevant to the description is omitted in the drawings, and like reference numerals in the specification denote like elements.

In the specification, when it is described that a certain part is "connected" to another part, it should be understood that the certain part may be directly connected to another part or indirectly connected to another part via another member in the middle. In addition, when a certain part "includes" a certain component, this indicates that the part may further include another component instead of excluding the other component unless stated otherwise.

Hereinafter, embodiments of the present disclosure are described in detail with reference to the accompanying drawings.

A separator according to an embodiment of the present disclosure may include fibrils including a polyolefin; and bond structures generated by reacting at least some of a first radical formed on surfaces of the fibrils by a photoreactive material and a second radical formed in the photoreactive material.

The term "fibrils" used in the specification refer to parts of a polyolefin-based porous separator except for pores and may be interpreted as a surface of the separator and any area, which is in contact with outside air, inside the separator.

Figure 1:
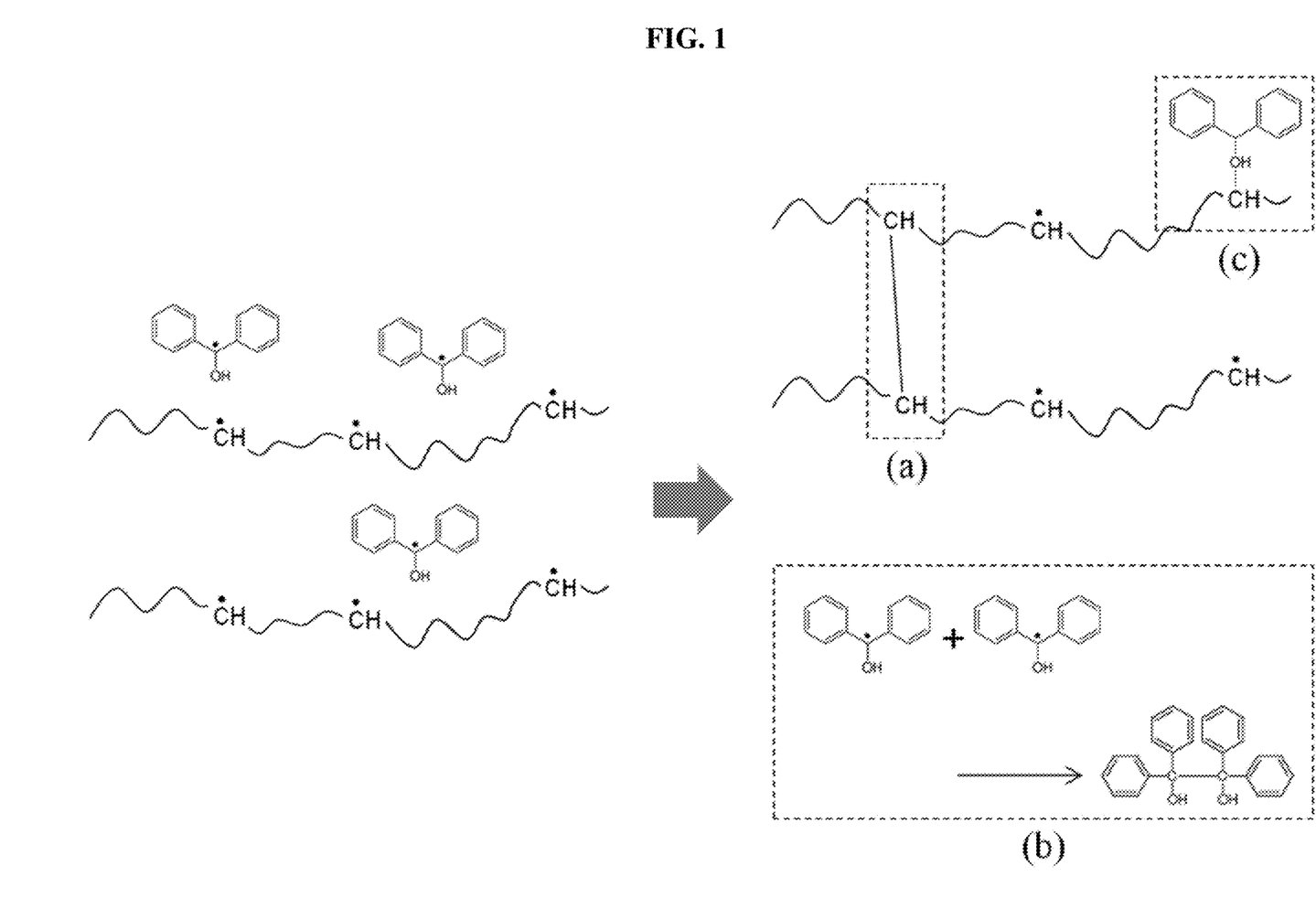
FIG. 1 illustrates the structure of a separator according to an embodiment of the present disclosure.

FIG. 1 illustrates the structure of a separator according to an embodiment of the present disclosure. Referring to FIG. 1, when a certain amount of light is irradiated, oxygen atoms included in a photoreactive material, e.g., benzophenone, extract hydrogen atoms from C—H bonds included in polyolefin chains, so that carbon radicals (first radical) may be formed in the polyolefin chains. Simultaneously, H is bonded to the oxygen atoms in the photoreactive material, and a radical (second radical) may be generated at carbonyl carbons.

A system including different radicals (the first and second radicals) may be converted to at least one bond structure of FIGS. 1(a) to (c). First, carbon radicals (first radical) generated in adjacent polyolefin chains may be mutually cross-linked to generate a C—C bond ((a)), benzophenones, each having a carbonyl carbon at which a radical (second radical) is generated, mutually react to generate benzopinacol ((b)), and a radical (second radical) generated at a carbonyl carbon of the benzophenone reacts with a carbon radical (first radical) generated in the polyolefin chain so that the benzophenone is bonded to the polyolefin chain ((c)).

In particular, referring to bond structures illustrated in FIG. 1, (a) shows crosslinking between adjacent polyolefin chains, which may significantly improve mechanical properties and heat resistance of the separator; (b) shows that two benzophenone molecules, each having carbonyl carbons at which radicals are generated, mutually react to generate benzopinacol. The two benzophenone molecules serve to substantially tie adjacent polyolefin chains although the benzophenone molecules do not chemically bond with the polyolefin chain, which may contribute to improvement of mechanical properties and heat resistance of the separator.

The polyolefin may have a weight average molecular weight (Mw) of 250,000 to 800,000 and a molecular weight distribution (Mw/Mn) of 3 to 7.

When the weight average molecular weight of the polyolefin is less than 250,000, melt viscosity is excessively decreased such that dispersibility of a pore-forming agent is extremely decreased. In some cases, phase separation or layer separation between the polyolefin and the pore-forming agent may occur. When the weight average molecular weight of the polyolefin is greater than 800,000, melt viscosity increases such that processability is decreased and, accordingly, non-uniform kneading may occur during melt kneading. The molecular weight distribution (Mw/Mn) of the polyolefin may be 3 to 7. When the molecular weight distribution of the polyolefin is less than 3, dispersibility with a pore-forming agent is decreased such that uniformity of the separator may be decreased. When the molecular weight distribution of the polyolefin is greater than 7, mechanical strength of a final separator may be decreased.

The polyolefin may be one selected from the group consisting of polyethylene, polypropylene, polybutylene, polymethylpentene, ethylene vinyl acetate, ethylene butyl acrylate, ethylene ethyl acrylate and a combination or copolymer of two or more thereof, preferably polyethylene, but the present disclosure is not limited thereto.

The term "photoreactive material" used in the specification may be interpreted as a generic term for a material whose structure, activity, and the like are changed by light.

For example, the photoreactive material may be a photoinitiator. The photoinitiator refers to a material that absorbs energy from a light source, particularly a UV light source, to initiate a polymerization reaction.

The photoinitiator is not specifically limited so long as it can be excited by light irradiation to cause photopolymerization, and may be, for example, a hydrogen abstraction type, a directly cleavable type, or an ion-reactable type. In the present disclosure, a hydrogen abstraction photoinitiator is preferred.

The hydrogen abstraction photoinitiator refers to a substance that induces the formation of polymer radicals necessary for a photocrosslinking reaction by releasing hydrogen from a main chain, such as a polymer, in a photoexcited state. The hydrogen abstraction photoinitiator may generate the polymer radicals more efficiently than other initiators, thereby having an improved photocrosslinking effect. The hydrogen abstraction photoinitiator may be one selected from a group consisting of benzophenone-, camphorquinone-, anthraquinone-, thiozanthone-, α-hydroxyketone-, bisacylphosphinoxide-, α-aminoketone-, phenylglyoxylate-, monoacylphosphinoxide-, and benzildimethylketal-based photoinitiators, substituents or derivatives thereof, and combinations of two or more thereof.

The separator may have one or more bond structures generated by a reaction between radicals that are generated in the photoreactive material under certain conditions without inclusion of a conventional linking agent or crosslinking agent. As needed, the bond structure may further include one linking agent selected from a group consisting of divinylbenzene, bisphenol-A dimethacrylate, bisphenol-A epoxydiacrylate, triallyl cyanurate, triallyl isocyanurate, pentaerythritol triallyl ether, butanediol diacrylate, ethylene glycol diacrylate, and combinations of two or more thereof.

The linking agent plays a secondary role in improving the mechanical properties of a separator through photocrosslinking and lowering a thermal contraction rate and may include two or more vinyl groups.

The content of the bond structure in the separator may be 0.001 to 10% by weight. The content of the bond structure may be adjusted depending upon the concentration of a solution including a photoreactive material applied to and/or impregnated in a porous membrane to manufacture the separator, and the amount of the solution applied and/or impregnated per unit area. When the content of the bond structure in the separator is less than 0.001% by weight, a required meltdown temperature may not be realized. When the content of the bond structure in the separator is greater than 10% by weight, brittleness of the separator may increase such that tensile strength and tensile elongation may be decreased.

The separator may satisfy one or more the following conditions (i) to (v), preferably all of the conditions (i) to (v): (i) meltdown temperature: 170° C. or higher, preferably 170 to 350° C., more preferably 210 to 350° C.; (ii) machine-direction (MD) tensile strength: 700 to 3,000 kgf/cm$^2$, preferably 2,000 to 2,800 kgf/cm$^2$, more preferably 2,150 to 2,800 kgf/cm$^2$; (iii) transverse-direction (TD) tensile strength: 700 to 3,000 kgf/cm$^2$, preferably 2,000 to 2,800 kgf/cm$^2$, more preferably 2,150 to 2,800 kgf/cm$^2$; (iv) machine-direction (MD) tensile elongation: 30 to 150%, preferably 50 to 100%; and (v) transverse-direction (TD) tensile elongation: 30 to 150%, preferably 50 to 100%.

Another aspect of the present disclosure provides a method of manufacturing a separator, the method including (a) feeding a composition including a polyolefin and a pore-forming agent into an extruder and molding and stretching the same into a sheet; (b) extracting the pore-forming agent from the stretched sheet to manufacture a porous membrane; (c) applying a solution including a photoreactive material to the porous membrane or impregnating the porous membrane in the solution; and (d) irradiating the porous membrane with light to generate bond structures by reacting at least some of a first radical formed by the photoreactive material and a second radical formed in the photoreactive material.

In the step (a), a composition including a pore-forming agent and a polyolefin that has a weight average molecular weight (Mw) of 250,000 to 800,000 and a molecular weight distribution (Mw/Mn) of 3 to 7 is extruded and discharged through a T-die, and then stretched, thereby manufacturing a base sheet.

The polyolefin may be one selected from a group consisting of polyethylene, polypropylene, polybutylene, polymethylpentene, ethylene vinyl acetate, ethylene butyl acrylate, ethylene ethyl acrylate and a combination or copolymer of two or more thereof, preferably polyethylene, but the present disclosure is not limited thereto.

The composition may include 10 to 40% by weight of the polyolefin and 60 to 90% by weight of the pore-forming agent. When the content of the polyolefin in the composition is less than 10% by weight, melt viscosity of an extruded melt is decreased such that it is difficult to mold or cast an appropriate sheet and the mechanical strength of a stretched porous membrane may be decreased. When the content of the polyolefin in the composition is greater than 40% by weight, melt viscosity of an extruded melt increases such that it is difficult to mold or cast a sheet due to worsened die-swell phenomenon after being discharged through a T-die discharge, and it is difficult to generate an appropriate microporous structure in a porous membrane.

The pore-forming agent may be one selected from a group consisting of paraffin oil, paraffin wax, mineral oil, solid paraffin, soybean oil, rapeseed oil, palm oil, coconut oil, di-2-ethylhexyl phthalate, dibutyl phthalate, diisononyl phthalate, diisodecyl phthalate, bis(2-propylheptyl)phthalate, naphthenic oil and combinations of two or more thereof, preferably paraffin oil, more preferably paraffin oil having a kinematic viscosity of 50 to 100 cSt at 40° C., but the present disclosure is not limited thereto.

In the step (a), the stretching may be performed by a known method such as uniaxial stretching or biaxial stretching (sequential or simultaneous biaxial stretching). In the case of the sequential biaxial stretching, a stretching ratio may be 4 to 20 times in each of a transverse direction (TD) and a machine direction (MD), and a surface stretching ratio due to the stretching may be 16 to 400 times.

In the step (c), a solution including a photoreactive material may be applied to the porous membrane from which the pore-forming agent has been extracted and removed or the porous membrane may be impregnated in the solution to apply the solution to at least some of polyolefin fibrils included in the porous membrane. The application may be performed by any known method such as roll coating, bar coating, or spray coating.

The solution may include a photoreactive material and, as needed, may further include the aforementioned linking agent. The content of the photoreactive material in the solution may be 0.01 to 20% by weight, preferably 0.01 to 15% by weight. The content of the bond structure in the separator may be adjusted into a range of 0.001 to 10% by weight by adjusting the concentration of the solution including the photoreactive material applied to and/or impregnating the porous membrane into the range. In addition, when the content of the photoreactive material in the solution is less than 0.01% by weight, a required meltdown temperature may not be realized. When the content of the photoreactive material in the solution is greater than 20% by weight, brittleness of the separator may increases such that tensile strength and tensile elongation may be decreased.

In the step (d), the porous membrane is irradiated with light to react at least some of the first radical formed by the photoreactive material and the second radical formed in the photoreactive material, thereby generating bond structures. The bond structures have been described above with reference to FIG. 1. The light may be ultraviolet light, i.e., UV, and an irradiation time required to generate the bond structures may be 1 minute or less, preferably 30 seconds or less, more preferably 1 to 30 seconds. When the irradiation time is less than 1 second, a required level of bond structures may not be generated. When the irradiation time is greater than 1 minute, the generation of the bond structures converges to the required level, which is disadvantageous in terms of economic efficiency and productivity.

Hereinafter, the present disclosure will be described in detail with reference to examples.

EXAMPLE 1

35 parts by weight of high-density polyethylene (HDPE) having a weight average molecular weight (Mw) of 350,000 and a molecular weight distribution (Mw/Mn) of 5 and 65 parts by weight of paraffin oil having a kinematic viscosity of 70 cSt at 40° C. were mixed and fed into a twin-screw extruder (inner diameter: 58 mm, L/D=56). Under conditions of a screw rotation speed of 40 rpm and 200° C., the mixture was discharged from the twin-screw extruder to a T-die with a width of 300 mm and then passed through a 40° C. casting roll. As a result, a base sheet having a thickness of 800 μm was manufactured.

The base sheet was stretched six times in a machine direction (MD) in a 110° C. roll stretching machine and was stretched seven times in a transverse direction (TD) in a 125° C. tenter stretching machine, thereby manufacturing a film. The film was impregnated in a 25° C. dichloromethane leaching tank, and paraffin oil was extracted and removed from the film for 1 minute, followed by impregnation in an impregnation tank containing a dichloromethane solution in which the concentration of benzophenone had been adjusted to 1% by weight, and then drying at 50° C. for 5 minutes. Next, the film was heat-set by relaxing 10% in a transverse direction (TD) at 130° C. to manufacture a porous film.

Both surfaces of the porous film were respectively irradiated with an energy of 2 J/cm$^2$ for 10 seconds by means of a 120 W ultraviolet light lamp, thereby manufacturing a porous separator.

EXAMPLE 2

35 parts by weight of high-density polyethylene (HDPE) having a weight average molecular weight (Mw) of 350,000 and a molecular weight distribution (Mw/Mn) of 5 and 65 parts by weight of paraffin oil having a kinematic viscosity of 70 cSt at 40° C. were mixed and fed into a twin-screw extruder (inner diameter: 58 mm, L/D=56). Under conditions of a screw rotation speed of 40 rpm and 200° C., the mixture was discharged from the twin-screw extruder to a T-die with a width of 300 mm and then passed through a 40° C. casting roll. As a result, a base sheet having a thickness of 800 μm was manufactured.

The base sheet was stretched six times in a machine direction (MD) in a 110° C. roll stretching machine and was stretched seven times in a transverse direction (TD) in a 125° C. tenter stretching machine, thereby manufacturing a film. The film was impregnated in a 25° C. dichloromethane leaching tank, and paraffin oil was extracted and removed from the film for 1 minute. Both surfaces of the film from which paraffin oil had been removed were spray-coated with a dichloromethane solution, in which the concentration of benzophenone had been adjusted to 1% by weight, in an amount of 100 g/m$^2$, followed by drying at 50° C. for 5 minutes. Next, the film was heat-set by relaxing 10% in a transverse direction (TD) at 130° C. to manufacture a porous film.

Both surfaces of the porous film were respectively irradiated with an energy of 2 J/cm$^2$ for 10 seconds by means of a 120 W ultraviolet light lamp, thereby manufacturing a porous separator.

EXAMPLE 3

35 parts by weight of high-density polyethylene (HDPE) having a weight average molecular weight (Mw) of 350,000 and a molecular weight distribution (Mw/Mn) of 5 and 65 parts by weight of paraffin oil having a kinematic viscosity of 70 cSt at 40° C. were mixed and fed into a twin-screw extruder (inner diameter: 58 mm, L/D=56). Under conditions of a screw rotation speed of 40 rpm and 200° C., the mixture was discharged from the twin-screw extruder to a T-die with a width of 300 mm and then passed through a 40° C. casting roll. As a result, a base sheet having a thickness of 800 μm was manufactured.

The base sheet was stretched six times in a machine direction (MD) in a 110° C. roll stretching machine and was stretched seven times in a transverse direction (TD) in a 125° C. tenter stretching machine, thereby manufacturing a film. The film was impregnated in a 25° C. dichloromethane leaching tank, and paraffin oil was extracted and removed from the film for 1 minute, followed by impregnation in an impregnation tank containing a dichloromethane solution in which the concentrations of benzophenone and divinylbenzene had been respectively adjusted to 0.5% by weight and 1% by weight, and then drying at 50° C. for 5 minutes. Next, the film was heat-set by relaxing 10% in a transverse direction (TD) at 130° C. to manufacture a porous film.

Both surfaces of the porous film were respectively irradiated with an energy of 2 J/cm$^2$ for 10 seconds by means of a 120 W ultraviolet light lamp, thereby manufacturing a porous separator.

EXAMPLE 4

35 parts by weight of high-density polyethylene (HDPE) having a weight average molecular weight (Mw) of 350,000 and a molecular weight distribution (Mw/Mn) of 5 and 65 parts by weight of paraffin oil having a kinematic viscosity of 70 cSt at 40° C. were mixed and fed into a twin-screw extruder (inner diameter: 58 mm, L/D=56). Under conditions of a screw rotation speed of 40 rpm and 200° C., the mixture was discharged from the twin-screw extruder to a T-die with a width of 300 mm and then passed through a 40° C. casting roll. As a result, a base sheet having a thickness of 800 μm was manufactured.

The base sheet was stretched six times in a machine direction (MD) in a 110° C. roll stretching machine and was stretched seven times in a transverse direction (TD) in a 125° C. tenter stretching machine, thereby manufacturing a film.

The film was impregnated in a 25° C. dichloromethane leaching tank, and paraffin oil was extracted and removed from the film for 1 minute. Both surfaces of the film from which paraffin oil had been removed were respectively spray-coated with a dichloromethane solution, in which the concentrations of benzophenone and divinylbenzene had been respectively adjusted to 0.5% by weight and 1% by weight, in an amount of 100 g/m² and then dried at 50° C. for 5 minutes. Next, the film was heat-set by relaxing 10% in a transverse direction (TD) at 130° C. to manufacture a porous film.

Both surfaces of the porous film were respectively irradiated with an energy of 2 J/cm² for 10 seconds by means of a 120 W ultraviolet light lamp, thereby manufacturing a porous separator.

EXAMPLE 5

A porous separator was manufactured in the same manner as in Example 1, except that the concentration of benzophenone in a dichloromethane solution contained in an impregnation tank was adjusted to 5% by weight.

EXAMPLE 6

A porous separator was manufactured in the same manner as in Example 1, except that the concentration of benzophenone in a dichloromethane solution contained in an impregnation tank was adjusted to 10% by weight.

EXAMPLE 7

A porous separator was manufactured in the same manner as in Example 1, except for replacing benzophenone in a dichloromethane solution contained in an impregnation tank with anthraquinone.

EXAMPLE 8

A porous separator was manufactured in the same manner as in Example 1, except that the concentration of benzophenone in a dichloromethane solution contained in an impregnation tank was adjusted to 11% by weight.

COMPARATIVE EXAMPLE 1

30 parts by weight of high-density polyethylene (HDPE) having a weight average molecular weight (Mw) of 350,000 and a molecular weight distribution (Mw/Mn) of 5 and 70 parts by weight of paraffin oil having a kinematic viscosity of 70 cSt at 40° C. were mixed and fed into a twin-screw extruder (inner diameter: 58 mm, L/D=56). Under conditions of a screw rotation speed of 40 rpm and 200° C., the mixture was discharged from the twin-screw extruder to a T-die with a width of 300 mm and then passed through a 40° C. casting roll. As a result, a base sheet having a thickness of 800 μm was manufactured.

The base sheet was stretched six times in a machine direction (MD) in a 110° C. roll stretching machine and was stretched seven times in a transverse direction (TD) in a 125° C. tenter stretching machine, thereby manufacturing a film. The film was impregnated in a 25° C. dichloromethane leaching tank, and paraffin oil was extracted and removed from the film for 1 minute, followed by drying at 50° C. for 5 minutes. As a result, a porous film was manufactured.

Next, the film was heat-set by relaxing 10% in a transverse direction (TD) at 130° C., thereby manufacturing a porous separator.

COMPARATIVE EXAMPLE 2

100 parts by weight of polypropylene having a melt index of 3.0 g/10 min, 0.05 part by weight of benzophenone as a photoinitiator, and 2 parts by weight of divinylbenzene as a linking agent were kneaded using a twin-screw extruder to granulate pellets. The pellets were extruded using a single-screw extruder equipped with a T-die, thereby manufacturing a precursor film. The precursor film was thermally treated in a 155° C. convection oven, and then heat-set by stretching 20% at room temperature, stretching 100% at 150° C. and relaxing 20% at 150° C. in a machine direction (MD) in a uniaxial stretching machine. The obtained porous film was light-exposed using a 6,000 W ultraviolet light lamp (1 max: 250 nm), thereby manufacturing a porous separator.

COMPARATIVE EXAMPLE 3

A porous separator was manufactured in the same manner as in Comparative Example 2, except that high-density polyethylene having a melt index of 1 g/10 min was used instead of polypropylene, heat treatment was performed in a 125° C. convection oven, and stretching and heat-setting were performed at 120° C.

COMPARATIVE EXAMPLE 4

A porous separator was manufactured in the same manner as in Comparative Example 2, except that benzildimethylketal was used instead of benzophenone and bisphenol-A epoxydiacrylate was used instead of divinylbenzene.

COMPARATIVE EXAMPLE 5

A porous separator was manufactured in the same manner as in Comparative Example 3, except that polypropylene having a melt index of 3.0 g/10 min was used instead of high-density polyethylene, a linking agent was not used, heat treatment was performed in a 155° C. convection oven, and stretching and heat-setting were performed at 150° C.

COMPARATIVE EXAMPLE 6

29.5 parts by weight of high-density polyethylene having a weight average molecular weight (Mw) of 350,000 and a molecular weight distribution (Mw/Mn) of 5, 0.5 part by weight of silane-modified high-density polyethylene, and 70 parts by weight of paraffin oil having a kinematic viscosity of 70 cSt at 40° C. were mixed and fed into a twin-screw extruder (inner diameter: 58 mm, L/D=56). Dibutyltin dilaurate, as a crosslinking catalyst, was previously dispersed in some of the paraffin oil, and the paraffin oil was introduced through a side injector of the twin-screw extruder to be 0.5% by weight based on a total weight of a material passing through the twin-screw extruder. Under conditions of a screw rotation speed of 40 rpm and 200° C., the mixture was discharged from the twin-screw extruder to a T-die with a width of 300 mm and then passed through a 40° C. casting roll. As a result, a base sheet having a thickness of 800 μm was manufactured.

The base sheet was stretched six times in a machine direction (MD) in a 110° C. roll stretching machine and was stretched seven times in a transverse direction (TD) in a 125° C. tenter stretching machine, thereby manufacturing a stretched film. The stretched film was impregnated in a 25° C. dichloromethane leaching tank and paraffin oil was extracted and removed from the stretched film for 1 minute. The film from which paraffin oil had been removed was dried at 50° C. for 5 minutes. Next, after heating to 125° C. in a tenter stretching machine, the film was stretched 1.45 times in a transverse direction (TD), and then relaxed to be heat-set to 1.25 times compared to before the stretching. The film was crosslinked in a constant temperature and humidity bath at 85° C. and a humidity of 85% for 72 hours, thereby manufacturing a porous separator.

COMPARATIVE EXAMPLE 7

A porous separator was manufactured in the same manner as in Example 1, except that the concentration of benzophenone in a dichloromethane solution contained in an impregnation tank was adjusted to 0.005% by weight.

COMPARATIVE EXAMPLE 8

35 parts by weight of high-density polyethylene having a melting temperature of 135° C. and a weight average molecular weight of 350,000, 65 parts by weight of paraffin oil having a kinematic viscosity of 70 cSt at 40° C., 2 parts by weight of trimethoxyvinylsilane, 2 parts by weight of dibutyltin dilaurate, and 0.04 part by weight of 2,5-dimethyl-2,5-di(tert-butylperoxy)hexane were mixed and fed into a twin-screw extruder (inner diameter: 58 mm, L/D=56). Under conditions of 200° C. and a screw rotation speed of 30 rpm, a silane-modified polyolefin composition was prepared by reacting and extruding in the twin-screw extruder, and discharged to a T-die with a width of 300 mm and then passed through a 40° C. casting roll. As a result, a base sheet having a thickness of 800 μm was manufactured. The base sheet was stretched 5.5 times in a machine direction (MD) in a 108° C. roll stretching machine and was stretched 5.5 times in a transverse direction (TD) in a 123° C. tenter stretching machine, thereby manufacturing a stretched film. The stretched film was impregnated in a 25° C. dichloromethane leaching tank and paraffin oil was extracted and removed from the film for 10 minutes. The film from which paraffin oil had been removed was heat-set at 127° C., thereby manufacturing a porous separator. The separator was crosslinked in a constant temperature and humidity bath at 80° C. and a humidity of 90% for 24 hours, thereby manufacturing a porous separator.

EXPERIMENTAL EXAMPLE 1

Experimental methods for measuring properties in the present disclosure are as follows. Unless otherwise stated, experiments were performed at room temperature (25° C.).

Thickness (μm): The thickness of a separator specimen was measured using a micro thickness gauge.

Porosity (%): The porosity of a separator specimen having a radius of 25 mm was measured according to ASTM F316-03 using Capillary Flow Porometer manufactured by PMI.

Tensile strength (kgf/cm$^2$): Stress was applied to a separator specimen having a size of 20×200 mm using a tensile strength meter to measure stress applied until the specimen was ruptured.

Tensile elongation (%): Stress was applied to a separator specimen having a size of 20×200 mm using a tensile strength meter to measure a maximum length elongated until the specimen was ruptured. A tensile elongation was calculated according to the following equation:

$$\text{Tensile elongation (\%)} = (l_1 - l_2)/l_1 * 100$$

wherein $l_1$ denotes a transversal or longitudinal length of a specimen before stretching, and $l_2$ denotes a transversal or longitudinal length of a specimen immediately before rupture.

Puncture strength (gf): Force was applied to a separator specimen having a size of 100×50 mm using a stick having a diameter of 0.5 mm at a speed of 0.05 cm/sec, and force applied when the specimen was punctured was measured using a puncture strength meter, the KES-G5 model, manufactured by KATO TECH.

Meltdown temperature (° C.): After applying a force of 0.01 N to a separator specimen using a thermomechanical analyzer (TMA), temperature was elevated at a rate of 5° C./minute to measure a deformation degree of the specimen. A temperature at which the specimen was ruptured was used as a meltdown temperature.

Heat shrinkage rate (%): A separator specimen having a size of 200×200 mm was placed between A4 paper and placed in a 120° C. oven for 1 hour, and then cooled at room temperature to measure contracted lengths in transverse and machine directions of the specimen. A heat shrinkage rate was calculated according to the following equation:

$$\text{Heat shrinkage rate (\%)} = (l_3 - l_4)/l_3 * 100$$

wherein $l_3$ denotes a transversal or longitudinal length of a specimen before contraction, and $l_4$ denotes a transversal or longitudinal length of a specimen after contraction.

Figure 2:
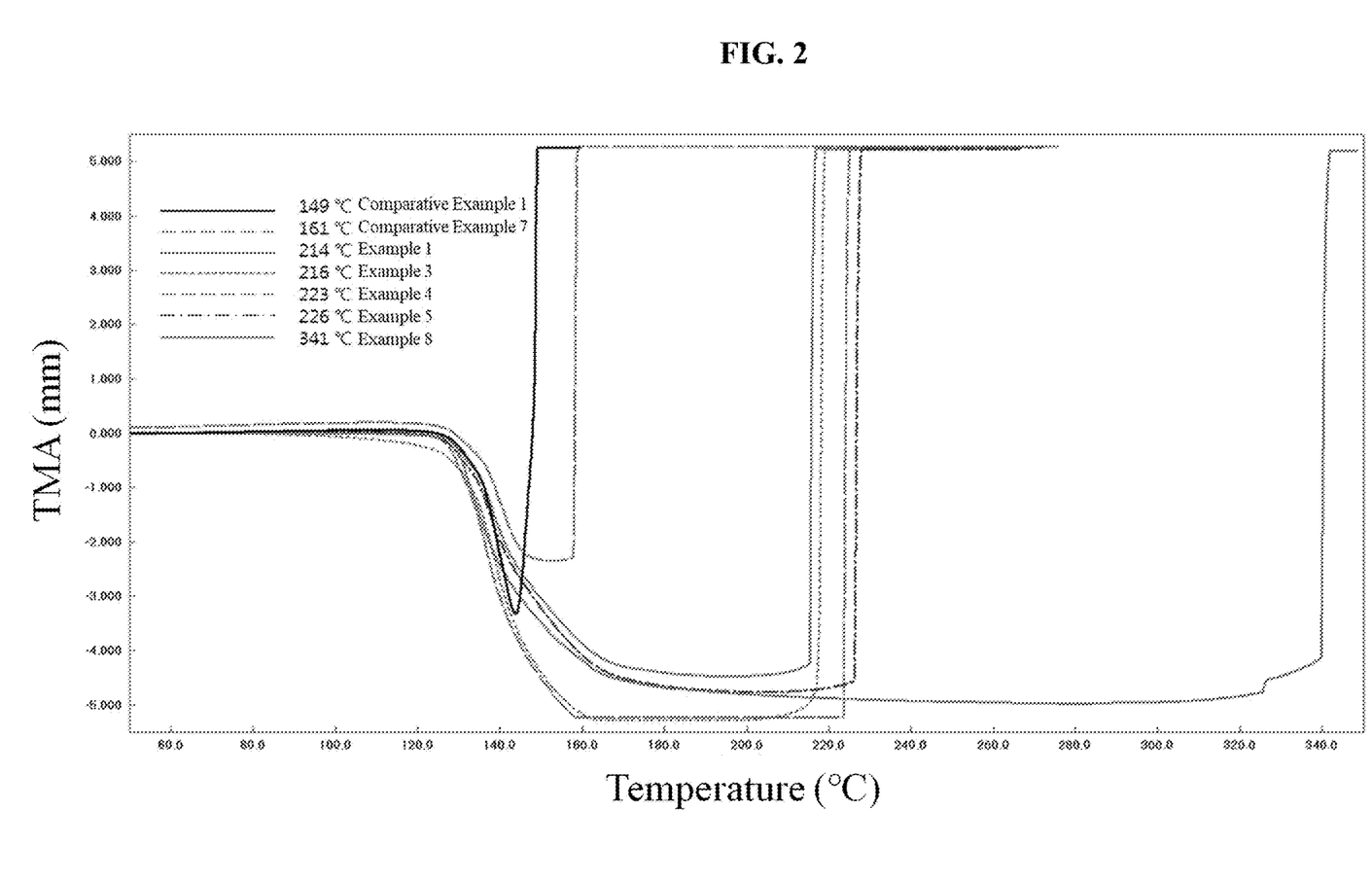
FIG. 2 illustrates thermomechanical analysis (TMA) results of separators according to examples and comparative examples of the present disclosure.

The properties of the separators manufactured according to the examples and the comparative examples were measured. Results are shown in FIG. 2 and the following Tables 1 and 2.

TABLE 1

| Classification | Example 1 | Example 2 | Example 3 | Example 4 | Example 5 | Example 6 | Example 7 | Example 8 |
| --- | --- | --- | --- | --- | --- | --- | --- | --- |
| Thickness | 12 | 12 | 12 | 12 | 12 | 12 | 12 | 12 |
| Porosity | 52 | 51 | 49 | 47 | 51 | 52 | 50 | 50 |
| MD tensile strength | 2,290 | 2,320 | 2,360 | 2,450 | 2,230 | 2,170 | 2,300 | 2,180 |
| MD tensile elongation | 54 | 61 | 72 | 75 | 49 | 51 | 52 | 50 |
| TD tensile strength | 2,190 | 2,200 | 2,280 | 2,310 | 2,150 | 2,120 | 2,210 | 2,150 |
| TD tensile elongation | 55 | 57 | 69 | 73 | 51 | 53 | 49 | 48 |
| MD heat shrinkage rate | 5 | 4.5 | 5 | 4.7 | 4.9 | 4.7 | 5 | 5.2 |

TABLE 1-continued

| Classification | Example 1 | Example 2 | Example 3 | Example 4 | Example 5 | Example 6 | Example 7 | Example 8 |
|---|---|---|---|---|---|---|---|---|
| TD heat shrinkage rate | 8 | 7.8 | 8 | 7.7 | 8.2 | 8.1 | 8.3 | 8.5 |
| Puncture strength | 365 | 354 | 345 | 330 | 380 | 410 | 385 | 375 |
| Meltdown temperature | 214 | 212 | 216 | 223 | 226 | 240 | 215 | 341 |

TABLE 2

| Classification | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Thickness | 12 | 20 | 20 | 20 | 20 | 9.6 | 12 | 12 |
| Porosity | 51 | 42 | 47 | 45 | 43 | 52 | 51 | 50 |
| MD tensile strength | 2,420 | 980 | 1,250 | 940 | 950 | 1,590 | 2,370 | 819 |
| MD tensile elongation | 67 | 51 | 53 | 62 | 55 | 60 | 61 | 37 |
| TD tensile strength | 2,340 | 90 | 95 | 70 | 60 | 1,090 | 2,260 | 885 |
| TD tensile elongation | 65 | 3 | 7 | 4 | 2 | 55 | 59 | 28 |
| MD heat shrinkage rate | 7 | 2.6 | 1.4 | 1.5 | 1.2 | 5 | 4.8 | 5.2 |
| TD heat shrinkage rate | 10 | 0 | 0 | 0 | 0 | 10 | 8.6 | 8.7 |
| Puncture strength | 322 | 440 | 430 | 420 | 240 | 230 | 375 | 245 |
| Meltdown temperature | 149 | 165 | 144 | 167 | 166 | 205 | 161 | N.D. |

EXPERIMENTAL EXAMPLE 2

Each of separators manufactured according to Example 1 and Comparative Examples 1 and 6 was fixed to a frame (outer edge: 15 cm×15 cm, inner diameter: 10 cm×10 cm) using a polyimide tape, and then placed in a convection oven while elevating a temperature at a temperature elevation rate of 3° C./minute from 80° C.

Figure 3:
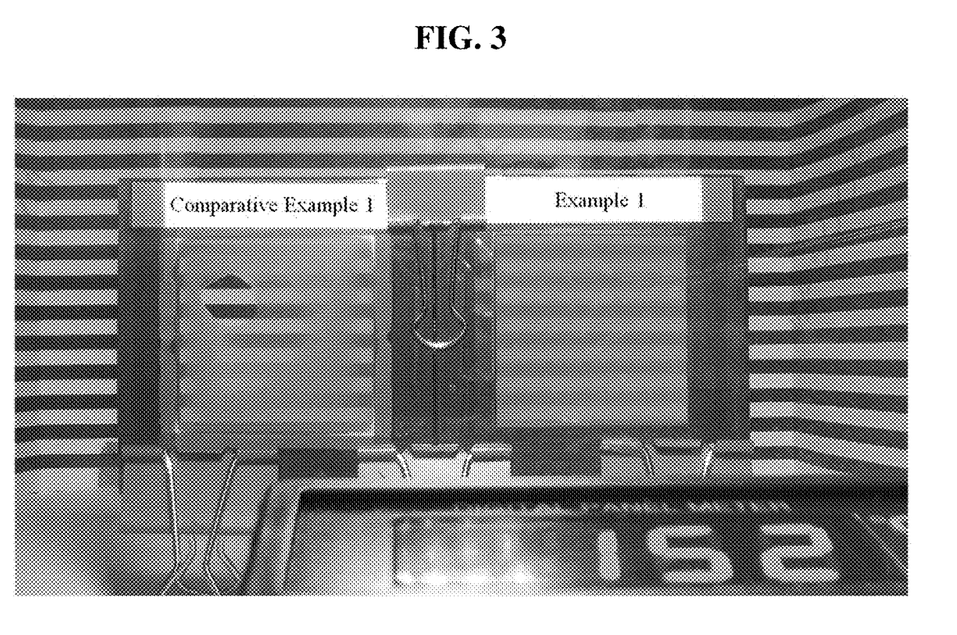
FIGS. 3 and 4 illustrate rupture temperatures of separators according to an example and comparative examples of the present disclosure during exposure to high temperature.
Figure 4:
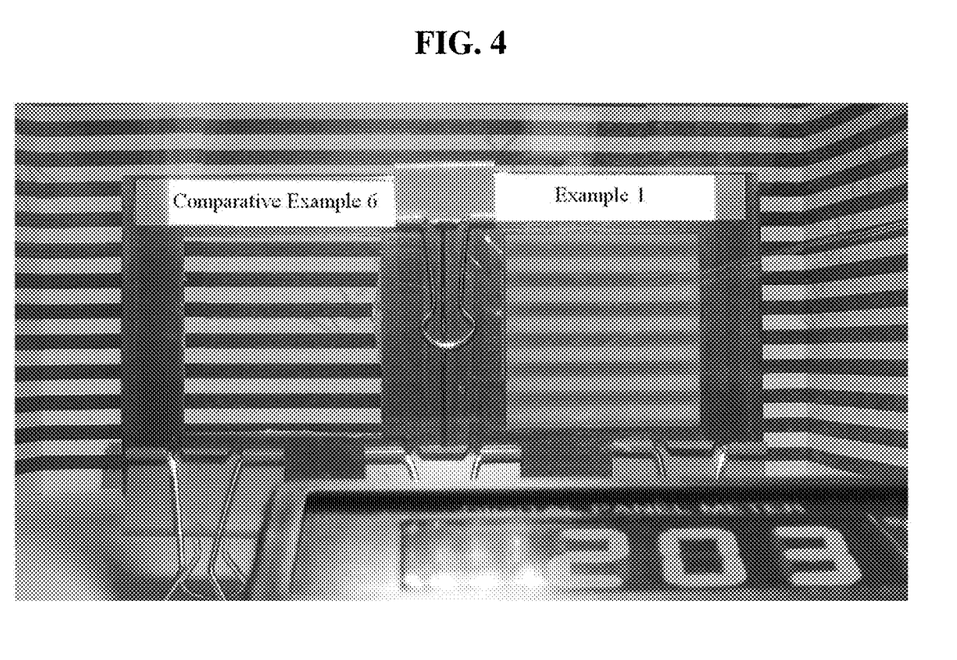

FIGS. 3 and 4 illustrate temperature change-dependent rupture temperatures of the separators manufactured according to Example 1 and Comparative Examples 1 and 6. First, referring to FIG. 3, the separator of Comparative Example 1 was completely melt-ruptured at 152° C., but the separator of Example 1 practically maintained the (opacity) transparency observed at the start of the temperature elevation step. In addition, referring to FIG. 4, the separator of Comparative Example 6 was observed to be completely transparent at 203° C. and some edges of the separator were melt-ruptured. On the other hand, the separator of Example 1 practically maintained the (opacity) transparency observed at the start of the temperature elevation step.

A porous separator according to an aspect of the present disclosure includes polyolefin-containing fibrils constituting the porous separator; and bond structures formed by reacting at least some of a plurality of radicals formed on surfaces of the fibrils by a photoreactive material, thereby harmoniously improving mechanical properties and heat resistance.

In addition, a method of manufacturing a separator according to another aspect of the present disclosure includes applying a solution including a photoreactive material to a porous separator or impregnating the porous separator in the solution, and then irradiating the porous separator with light to crosslink the photoreactive material, thereby shortening the time required for crosslinking to 1 minute or less, resulting in significantly improved productivity.

It should be understood that the effects of the present disclosure are not limited to the effects described above, but include all effects that can be deduced from the detailed description of the present disclosure or the constitution of the disclosure described in the claims.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure. For example, each of constituents described as a single form may be separately implemented and, similarly, constituents described as being separated may be implemented in a combined form.

It should be understood that the scope of the present disclosure is defined by the following claims and the disclosure is to cover all modifications, equivalents, and alternatives falling within the spirit and scope of the disclosure as defined by the claims.

What is claimed is:

1. A method of manufacturing a separator, the method comprising:
   feeding a composition comprising a polyolefin and a pore-forming agent into an extruder and molding and stretching the same into a sheet;
   extracting the pore-forming agent from the stretched sheet to manufacture a porous membrane;

applying a solution comprising a photoreactive material to the porous membrane or impregnating the porous membrane in the solution;

heat setting the porous membrane by relaxing the porous membrane in a transverse direction; and irradiating the porous membrane with light to generate bond structures by reacting at least some of a first radical formed by the photoreactive material and a second radical formed in the photoreactive material, wherein the feeding, the extracting, the applying, and the heat setting, and the irradiating are performed in order, wherein a content of the photoreactive material in the solution is 0.01 to 0.5% by weight, wherein the bond structures comprise a crosslinked structure generated by mutually reacting the first radical generated in adjacent polyolefin chains, wherein the photoreactive material mutually reacts to tie the adjacent polyolefin chains, and wherein the separator satisfies (i), (ii) and (iii):
(i) melt down temperature: 210 to 350° C.;
(ii) machine-direction (MD) tensile strength: 2,360 to 2,800 kgf/cm$^2$;
(iii) transverse-direction (TD) tensile strength: 2,280 to 2,800 kgf/cm$^2$;
(iv) machine direction (MD) tensile elongation: 72 to 150%; and
(v) transverse direction (TD) tensile elongation: 69 to 150%.

2. The method according to claim 1, wherein the polyolefin has a weight average molecular weight (Mw) of 250,000 to 800,000 and a molecular weight distribution (Mw/Mn) of 3 to 7.

3. The method according to claim 1, wherein the polyolefin is one selected from a group consisting of polyethylene, polypropylene, polybutylene, polymethylpentene, ethylene vinyl acetate, ethylene butyl acrylate, ethylene ethyl acrylate and a combination or copolymer of two or more thereof.

4. The method according to claim 1, wherein the photoreactive material is a hydrogen abstraction photoinitiator.

5. The method according to claim 4, wherein the hydrogen abstraction photoinitiator is one selected from a group consisting of benzophenone-, camphorquinone-, anthraquinone-, thiozanthone-, α-hydroxyketone-, bisacylphosphinoxide-, α-aminoketone-, phenylglyoxylate-, monoacylphosphinoxide-, and benzildimethylketal-based photoinitiators, substituents or derivatives thereof, and combinations of two or more thereof.

6. The method according to claim 1, wherein the bond structure further comprises one linking agent selected from a group consisting of divinylbenzene, bisphenol-A dimethacrylate, bisphenol-A epoxydiacrylate, triallyl cyanurate, triallyl isocyanurate, pentaerythritol triallyl ether, butanediol diacrylate, ethylene glycol diacrylate, and combinations of two or more thereof.

* * * * *